July 5, 1927.
W. L. KRIEG
1,635,087
BRAKE
Filed Sept. 21 1925
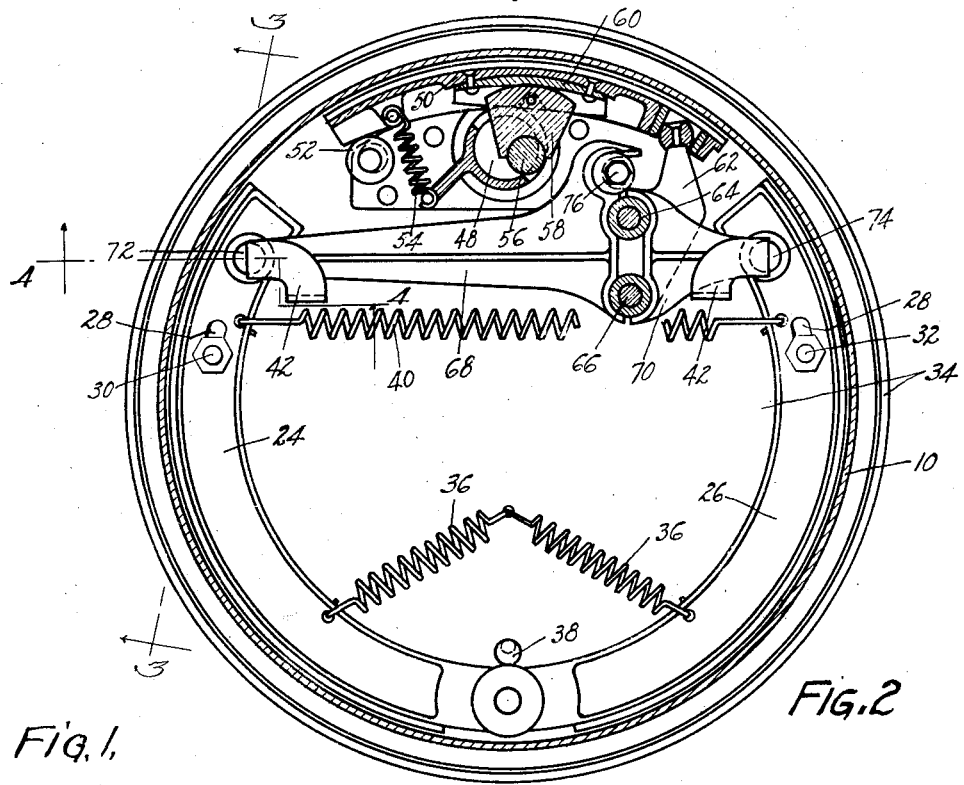
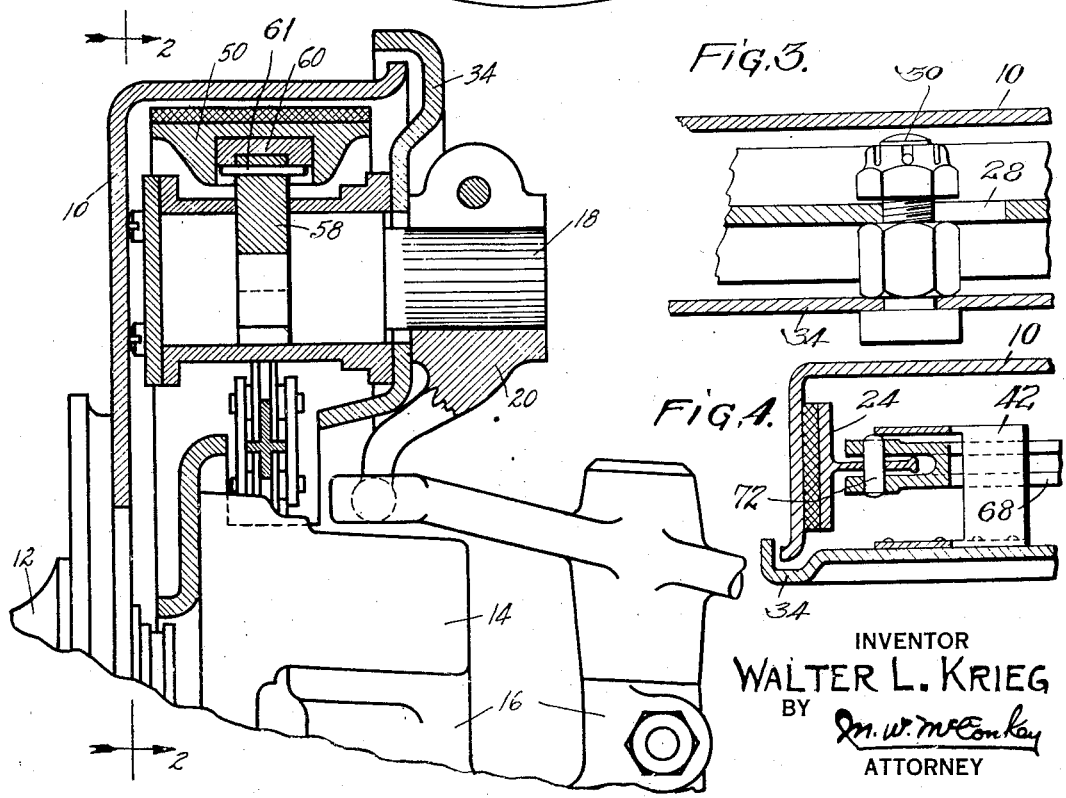
INVENTOR
WALTER L. KRIEG
BY
M. W. McConkey
ATTORNEY Patented July 5, 1927.

1,635,087

UNITED STATES PATENT OFFICE.

WALTER L KRIEG, OF CHICAGO, ILLINOIS, ASSIGNOR TO BENDIX BRAKE COMPANY, OF CHICAGO, ILLINOIS, A CORPORATION OF ILLINOIS.

BRAKE.

Application filed September 21, 1925. Serial No. 57,594.

This invention relates to brakes, and is illustrated as embodied in a front wheel brake for an automobile. An object of the invention is to lessen the pedal pressure required in applying the brake, by arranging a servo device to apply a brake of the "double-wrapping" or "duo-servo" type, the servo action of the brake itself and of the servo device being cumulative.

In one desirable arrangement the servo device includes a floating friction member arranged between the ends of the brake shoes or their equivalent, and applying the shoes by connections which shift automatically to compensate for movement of the shoes as they anchor at one end or the other, according to the direction the drum is turning.

These and other features and advantages of the invention will be apparent from the following description of one illustrative embodiment shown in the accompanying drawing, in which:

Figure 1 is a vertical section through the upper part of the brake and associated parts;

Figure 2 is a vertical section through the brake on the line 2—2 of Figure 1, showing the shoes in side elevation;

Figure 3 is a partial section on the line 3—3 of Figure 2, showing one of the brake anchors; and Figure 4 is a partial section on the line 4—4 of Figure 2, showing the pivoting of the connections to one of the shoes.

The illustrated brake includes a drum 10 rotating with the wheel, the hub of which is shown at 12, and which is rotatably mounted on the spindle of a knuckle 14 swivelled at one end of the axle 16. The brake is applied by a shaft 18 rocked by an arm 20 having a ball end engaged by a horizontal lever 22 fulcrumed on axle 16, and connected in any desired manner to the brake-operating mechanism.

The brake itself includes a floating friction device, preferably comprising connected floating shoes 24 and 26, having slots 28 in their ends to embrace anchors 30 and 32 carried by a backing plate 34 mounted on the knuckle 14. The shoes are yieldingly held by springs 36 against an adjustable eccentric stop 38, when in idle position, and are urged at their unconnected ends away from the drum by a spring 40. The unconnected ends are confined laterally by stampings 42 fastened to the backing plate. It will be noted that when the brake is applied with the drum turning in a clockwise direction, shoe 24 anchors against anchor 30, shoe 26 leaving its anchor 32; whereas if the drum is turning in a counter-clockwise direction, shoe 26 anchors against the anchor 32 and shoe 24 leaves the anchor 30.

The brake is applied by a floating servo shoe 50, between the ends of shoes 24 and 26 and therefore engaging the same zone of the drum. Shoe 50 rests in idle position on a roller 52, and in applying the brake is forced against the resistance of a spring 54 into engagement with the drum, by means of an eccentric pin 56 on shaft 18, operating a block or segmental roller 58 rolling against a hardened wear plate 60 and having a cross pin 61 in notches formed in side flanges of the wear plate.

When in engagement with the drum, the friction forces the shoe 50 in one direction or the other, rocking a floating lever 62 having a ball end received in a socket in the lower face of the servo shoe. Lever 62 carries two rollers 64 and 66 seated in mating semi-cylindrical recesses in the ends of thrust members 68 and 70 pivoted to the ends of shoes 24 and 26 at 72 and 74. The idle positions of lever 62 and members 68 and 70 are determined by a hook on member 68 embracing a pin 76 on the backing plate. Thus whichever way shoe 50 moves, members 68 and 70 are forced apart to apply the brake, while lever 62 as well as members 68 and 70 can shift to center themselves and equalize the pressure and at the same time to compensate for the anchoring of shoe 24 or 26, as the case may be.

While one illustrative embodiment has been described in detail, it is not my intention to limit the scope of the invention to that particular embodiment, or otherwise than by the terms of the appended claims.

I claim:

1. A brake comprising, in combination, a drum, a floating friction device engageable with the drum and anchoring at one end when the drum is turning in one direction and at the other end when the drum is turning in the other direction, a floating servo member between said ends of the friction device, and a device rocked by movement of the servo member and connections operated by rocking of said device for forcing the ends of the friction device in opposite directions against the drum.

2. A brake comprising, in combination, a drum, a floating friction device engageable with the drum and anchoring at one end when the drum is turning in one direction and at the other end when the drum is turning in the other direction, a servo member engageable and movable with the drum, and connections operated by movement of the servo member for forcing the friction device against the drum, the connections being shiftable to permit the anchoring of the friction device at either end and being arranged to thrust both ends of the friction device against the drum in either direction of rotation of the drum.

3. A brake comprising, in combination, a drum, a floating friction device engageable with the drum and anchoring at one end when the drum is turning in one direction and at the other end when the drum is turning in the other direction, a servo member engageable and movable with the drum, and connections operated by movement of the servo member for forcing the friction device against the drum, the connections being shiftable to center themselves automatically with respect to the friction device and being arranged to thrust both ends of the friction device against the drum in either direction of rotation of the drum.

4. A brake comprising, in combination, a drum, a floating friction device engageable with the drum and anchoring at one end when the drum is turning in one direction and at the other end when the drum is turning in the other direction, a servo member engageable and movable with the drum, a floating lever rocked by movement of the servo member in either direction, and floating connections from the lever for forcing the ends of the friction device in opposite directions against the drum, the lever and connections shifting automatically to proportion the pressures on the two ends.

5. A brake comprising, in combination, a drum, a floating friction device engageable with the drum and anchoring at one end when the drum is turning in one direction and at the other end when the drum is turning in the other direction, a servo member engageable and movable with the drum, a floating lever rocked by movement of the servo member, and thrust members from the lever for forcing the ends of the friction device apart against the drum, the lever and said members shifting automatically to proportion the pressures on the two ends.

6. A brake comprising, in combination, a drum, a plurality of floating connected shoes engageable with the drum, one of the shoes anchoring when the drum is turning in one direction and a different shoe anchoring when the drum is turning in the other direction, a servo shoe, and floating operating connections from the servo shoe for forcing the connected shoes against the drum, the connections being shiftable to compensate for the anchoring of one or the other shoe.

7. A brake comprising, in combination, a drum, a plurality of floating connected shoes engageable with the drum, one of the shoes anchoring when the drum is turning in one direction and a different shoe anchoring when the drum is turning in the other direction, a servo shoe between the ends of the connected shoes, and floating operating connections operated by movement of the servo shoe in either direction for forcing the connected shoes against the drum, the connections being shiftable to compensate for the anchoring of one or the other shoe.

8. A brake comprising, in combination, a drum, a floating friction device inside of and engageable with the drum and anchoring at one end when the drum is turning in one direction and at the other end when the drum is turning in the opposite direction, a floating servo member between said ends of the friction device, brake-applying means for forcing the servo member against the drum, and connections from the servo member to said ends, which connections are separate from and independent of the brake-applying means and which are operated by movement of the servo member with the drum to force the floating friction device against the drum.

9. A brake comprising, in combination, a drum, a floating friction device inside of and engageable with the drum and having its ends spaced apart, a floating servo member between said ends of the friction device, brake-applying means for forcing the servo member against the drum, and connections from the servo member to said ends, which connections are separate from and independent of the brake-applying means and which are operated by movement of the servo member with the drum to force the floating friction device against the drum.

10. A brake comprising, in combination, a drum, a floating friction device inside of and engageable with the drum, a servo member also engageable with the drum, brake-applying means for forcing the servo member against the drum, and connections from the servo member to the floating friction device which are separate from and independent of the brake-applying means and which are operated by the servo member to force the friction device against the drum.

In testimony whereof, I have hereunto signed my name.

WALTER L KRIEG.